March 26, 1940.  R. J. VAN DE GRAAFF ET AL  2,194,839
METHOD OF AND APPARATUS FOR ELECTROSTATICALLY
GENERATING DIRECT CURRENT POWER
Filed June 9, 1937  2 Sheets-Sheet 1

Inventors:
Robert J. Van de Graaff,
John G. Trump,
Attys.

March 26, 1940.   R. J. VAN DE GRAAFF ET AL   2,194,839
METHOD OF AND APPARATUS FOR ELECTROSTATICALLY
GENERATING DIRECT CURRENT POWER
Filed June 9, 1937    2 Sheets-Sheet 2
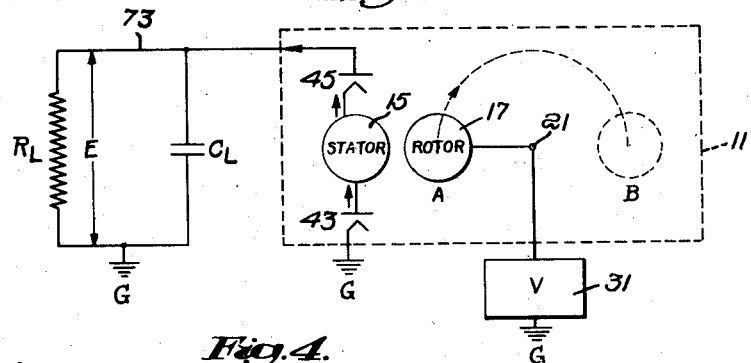
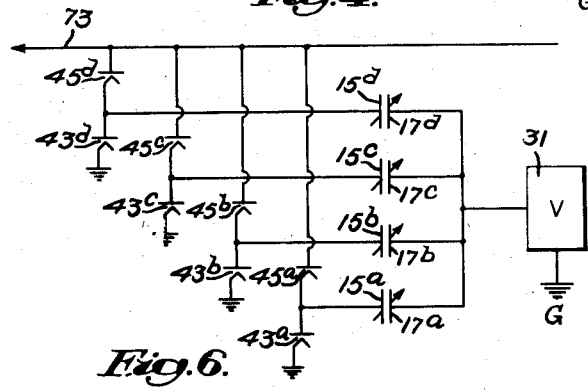
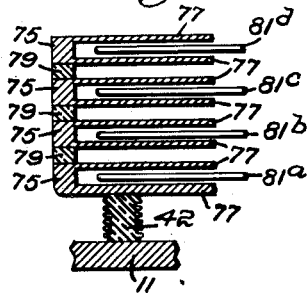
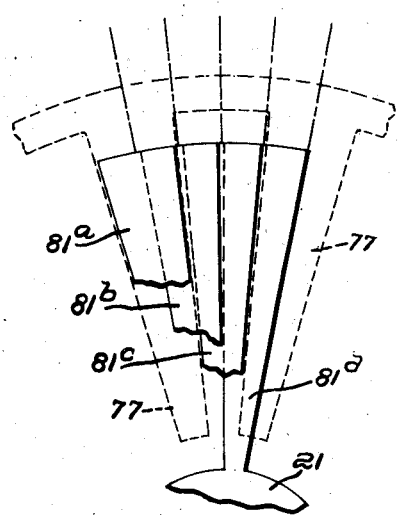
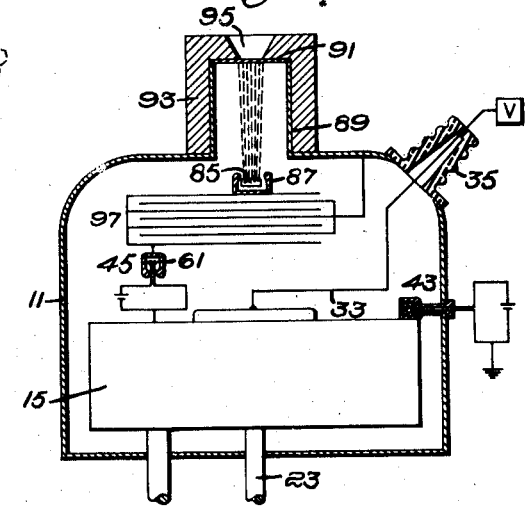
Inventors:
Robert J. Van de Graaff,
John G. Trump,
by their Attorneys Patented Mar. 26, 1940

2,194,839

UNITED STATES PATENT OFFICE

2,194,839

METHOD OF AND APPARATUS FOR ELECTROSTATICALLY GENERATING DIRECT CURRENT POWER

Robert J. Van de Graaff, Cambridge, and John G. Trump, Boston, Mass., assignors to Research Corporation, New York, N. Y., a corporation of New York Application June 9, 1937, Serial No. 147,280

19 Claims. (Cl. 171—329)

This invention relates to methods of and apparatus for electrostatically generating direct current power, and especially at high voltages, in usefully large amounts and under conditions assuring practical efficiency and reliability.

It has been recognized that technical and economic problems involved in the transmission of substantial amounts of electric power under high voltages might be lessened by the use of direct current. Certain of these advantages have been pointed out in Patent No. 2,024,957, granted December 17, 1935. The technical and economic difficulty of producing high voltage direct current power, however, has heretofore prevented any wide use of direct current power for these purposes.

The present invention has for its object, among other things, the efficient electrostatic generation and the transmission to a load circuit of useful amounts of power through methods, which it is believed provided for the first time a practical source of electrostatically generated direct current power.

Another object of the invention is to avail of the advantages of superior insulating media, such as carbon tetrachloride in gaseous state, or other compounds of like insulating properties, or gases at high pressure, or on the other hand highly rarefied media such as a high vacuum characterized by a pressure, for example, of the order of $10^{-5}$ millimeters of mercury, and to produce a novel type of electrostatic generator so constructed as to best avail of these high voltage vacuum insulating media and possessing the qualifications of efficiency and reliability as well as high power capacity per unit, size or weight for use under practical conditions in the generation and transmission of high voltage direct current power. In the present application the electrostatic generator, for illustrative purposes, is shown as arranged for operation in a high vacuum.

These and other objects of the invention will be best understood by reference to the following description when taken in connection with the accompanying illustration of one specific embodiment thereof, while its scope will be more particularly pointed out in the appended claims.

In the drawings:

Fig. 3 is a view showing diagrammatically the apparatus of Fig. 1 and its electrical connections and illustrative of its mode of operation;

Fig. 4 is a view illustrating diagrammatically the sectionalized arrangement of the generator for producing a substantially steady flow of unidirectional current;

Figs. 5 and 6 are fragmentary views illustrating in section and elevation, respectively, the relative arrangement of the stator and rotor parts in the case of the illustrative sectionalized arrangement; and Fig. 7 is a view more or less diagrammatic showing the generator and load insulated in the same insulating medium.

Figure 2:
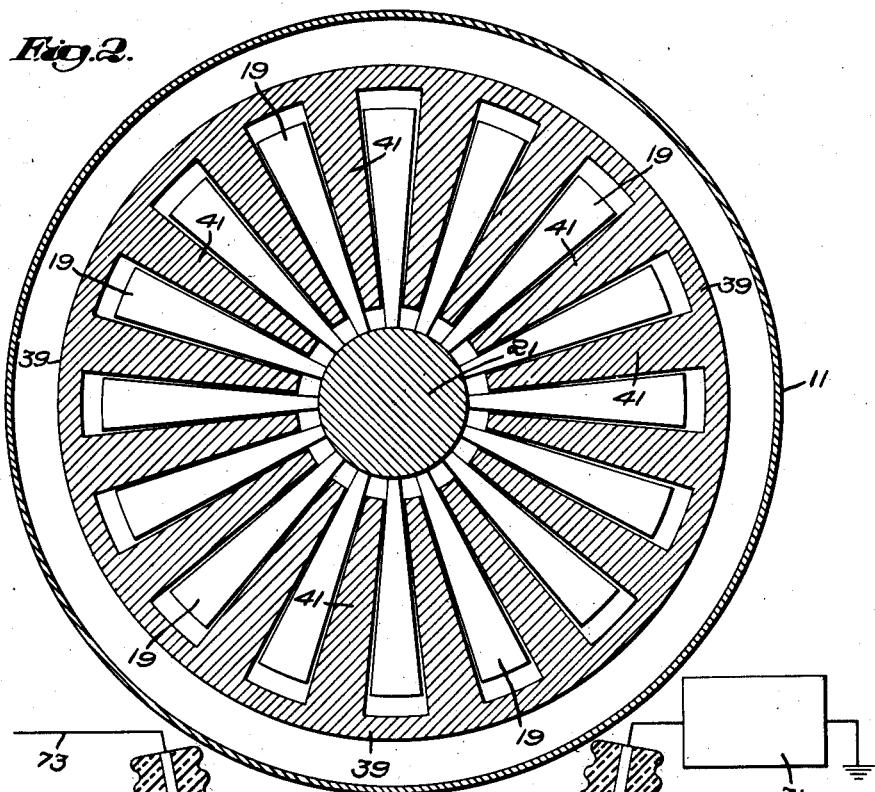
Fig. 2 is a transverse, sectional plan on the line 2—2 in Fig. 1.

Referring to the drawings and to the embodiment of the invention there shown for illustrative purposes, the generating, and preferably the devices for transferring charges to the line, are mounted inside a container 11, providing a hermetically sealed chamber, evacuated and maintained evacuated to a degree where the insulation of extremely high voltages with short electrode separations is possible. High vacuum may be maintained within the chamber by means of an efficient, high speed, high vacuum pump indicated diagrammatically at 13. The walls of the container, for practical reasons, are preferably metallic, and are grounded to avoid hazard.

The means for electrostatically inducing the required charges comprise relatively rotatable charge inducing and charge receiving elements contained within the evacuated chamber. Either the charge inducing or charge receiving element might be rotatable and the other stationary, or both might be rotated, but herein, to avoid mechanical stresses, secure a simplified and efficient mechanical arrangement and to eliminate some electrical problems in maintaining electrical contact between relatively movable parts, the charge receiving element is in the form of a stator 15, while the charge inducing element is in the form of a rotor 17.

Referring to the rotor, the latter comprises one or more (herein ten) multipolar members consisting each of sector shaped poles or plates 19 of conductive metal, each member comprising a number (herein sixteen) of poles lying in the same plane in equally spaced radial relation and having a common (and herein vertical) axis of rotation. The poles of each member are mounted on and in conductive relation to, or (as indicated in the drawings) may be formed integrally with, a common metallic rotatable hub member 21, which in turn is connected to be driven by a driving shaft 23 from any suitable source of external power, such as a turbine motor (not shown). In the construction shown in Figs. 1 and 2, poles of adjoining members are angularly aligned with each other lengthwise the axis of the rotor.

The driving shaft 23 drives the hub 21 through an insulating member 25 within the chamber, such member being rigidly connected to both the shaft and the hub. The shaft, mounted in a ball thrust bearing in the bottom walls of the chamber protrudes through and beyond the walls thereof.

A vacuum seal indicated at 27, and which may be of the nature described in prior Patent No. 2,064,703, is employed for sealing the joint between the protruding end of the shaft and the walls of the container against impairment of the high vacuum maintained within the chamber. The opposite end of the hub is mounted in ball bearings carried by an insulating member 29 supported on the stator shell, hereinafter referred to. The rotor, accordingly, comprises a unitary multipolar structure entirely of conductive metal insulated from its surroundings, and each pole of the several members constitutes a charge inducing element.

In the operation of the machine, the rotor is permanently and continuously connected to an independent source of high potential of constant polarity, preferably but not necessarily outside the chamber, for the purpose of inducing charges on the stator. This independent source of high potential serves merely the function of inducing electric charges on the stator, and only a small amount of electric energy required to maintain this potential is needed for this function. Such potential source (indicated diagrammatically at 31) preferably comprises electro-magentic means and may, for example, consist of a transformer connected to a source of alternating current and having one terminal on its high potential winding connected through a rectifier to the rotor and the other terminal to ground. The source of inducing potential should preferably have a high electrical capacitance relative to the rotor-stator capacitance in order to minimize current fluctuations. The potential source 31 has connection to the rotor through a conductor 33 passing through an insulating bushing 35 supported on the walls of the container into the chamber and having at its end a brush 37, or other suitable contact device, for making continuous contact with the exposed end of the rotary hub 21.

Referring to the stator 15, the latter comprises a stationary cylindrical metallic shell 39 surrounding but spaced from the periphery of the rotor and having longitudinally spaced members (herein eleven in number) of metallic sector shaped poles 41 projecting inwardly from the shell in very closely spaced and interleaving relation to and on opposite sides of the rotor poles 19. The poles of the stator members conform substantially to the spacing, area and shape of the rotor poles and terminate short of the periphery of the hub 21.

Figure 1:
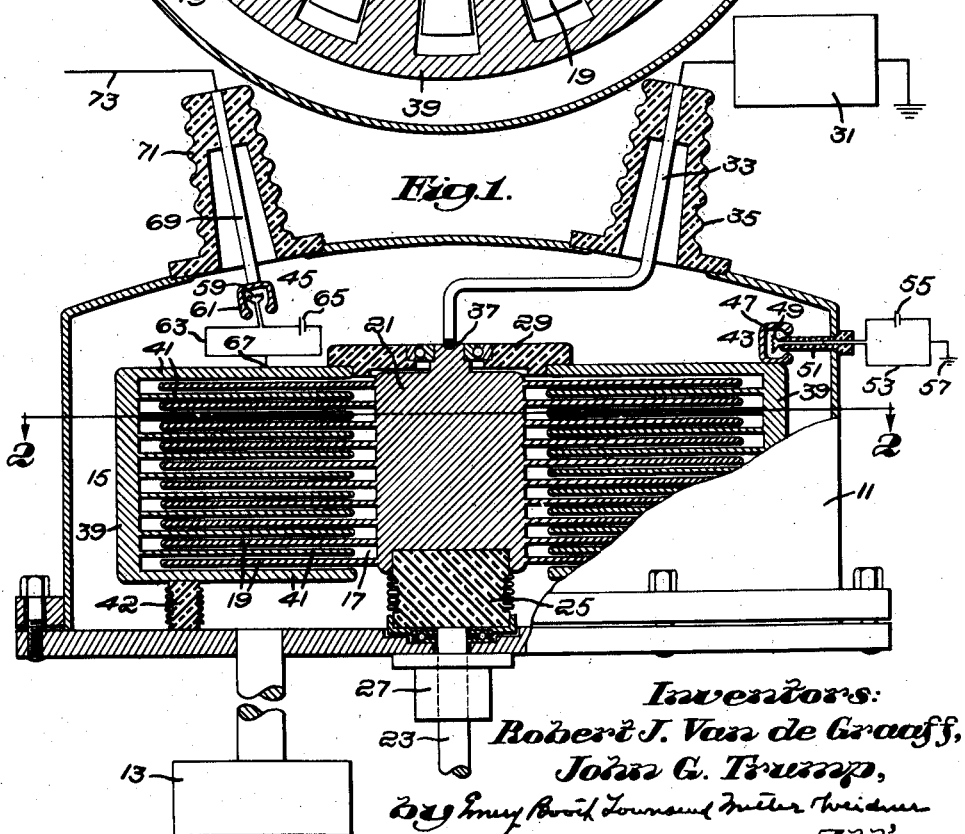
Fig. 1 is an elevation in partial cross-section of one form of apparatus adapted electrostatically to generate high voltage power and deliver it in the form of unidirectional current to a line.

The stator structure, the poles and shell of which also comprise a unitary multipolar structure of conductive metal, is insulated from the walls of the chamber of the container, being supported by the bottom wall thereof through a suitable number of insulators, one of which is shown at 42 in the section in Fig. 1. These and other insulators employed within the evacuated chamber preferably embody the principles of the insulators for the support of high voltage electrodes in vacuum set forth in Patent No. 2,082,474.

It will be seen that the stationary members and the closely adjacent but spaced members of the rotor constitute multipolar means for varying the capacitance of the rotor-stator structure from a maximum capacitance, when rotation has brought the rotor poles into a position where they align with the stator poles, to a minimum capacitance, when rotation has brought the rotor poles into a position where they align with the spaces between adjoining stator poles. The potential of constant polarity continuously applied to the unitary multipolar structure of the rotor results in the induction of electrical charges on the stator.

Means are herein provided for causing the charge thus induced to be transferred to a load circuit in the form of a unidirectional current under the influence of low potential differences. While this might be accomplished by other means, such as commutating devices, herein, to avoid difficulties of synchronizing such devices and their adjustment to meet changing load conditions, and further to avoid mechanical difficulties, there are employed electronic rectifiers or valves 43 and 45. To simplify the construction of rectifiers and avoid the necessity of individual evacuated glass or other envelopes, these rectifiers are also contained within the evacuated chamber itself. With insulating media other than vacuum, these electronic devices would obviously retain their evacuated envelopes.

In the form of the invention shown in Fig. 1, the rectifier 43 comprises a metallic cup 47 in permanent electrical connection to, and herein supported on, the shell 39 of the stator. Within but spaced from the surrounding walls of the cup is a filament 49, the terminals of which pass through the insulating bushing 51 to the exterior of the chamber. They are there included in a circuit 53 having any suitable source of filament excitation, which, for illustration, is indicated as a battery 55, the circuit having a ground connection 57 which may be regarded as the low potential side of the load circuit. Although here shown outside of the chamber 11, the circuit 53 and source of filament power might be positioned within the chamber.

The second rectifier 45 comprises a filament 59 contained within and spaced from the walls of a metallic cup 61. The filament 59 is included in a circuit 63, also containing a source of excitation. The latter might be a generator driven through an insulating link by the rotor, but herein is also diagrammatically indicated as a battery or dry cell 65. The circuit 63 is electrically connected to the stator shell at 67 so that its potential rises and falls with that of the stator. The cup 61 is supported by a conductor 69 which passes through insulating bushing 71 on the walls of the container, passing through the bushing to the exterior of the evacuated chamber, where it has connection to a load circuit indicated at 73.

The action of the apparatus will be best understood from the diagrammatic representation in Fig. 3 in which the stator is represented by the charge receiving member 15 and the rotor by the charge inducing member 17, the latter continuously maintained at a substantially high potential V which is positive to the ground and is supplied from the potential source 31 of constant polarity outside of the casing 11 of the evacuated chamber, the walls of which are indicated in dotted lines. The rotor is represented as movable with relation to the stator about the axis 21, in the path represented by dotted lines in the direction of the arrow, moving from a position A, corresponding to maximum rotor-stator capacitance, to a position B, corresponding to minimum rotor-stator capacitance. The power output of the generator is assumed to be applied at an essentially constant load voltage E to an output circuit 73 having a resistance load $R_L$ and a capacitance load $C_L$ in parallel, the low potential side of the load being grounded at G.

At the beginning of the cycle, when the rotor and stator are in position A, corresponding to maximum rotor-stator capacitance, this capacitance is charged to the full value of the inducing potential V. At this point in the cycle, the stator, because of the immediately preceding cycle, as will hereafter appear, is substantially at ground potential. The valve 45 is withstanding the load voltage E and the valve 43 has just ceased conducting. Succeeding movement of the rotor causes the rotor-stator capacitance to diminish, and hence an increase of the stator potential with relation to ground. The potential across the valve 45 is diminished by the amount of this increase, while the potential across the valve 43 is increased by this amount. This continues until a point is reached where the stator has acquired the potential E of the output circuit. Further movement of the rotor toward the position of minimum capacitance then causes a charge to flow through the valve 45 into the output circuit, a process which continues until position B, corresponding to minimum rotor-stator capacitance, is reached. During this interval from position A to position B, the source of mechanical power, acting through the driving shaft 23 and causing the rotor to turn, is the agency which results in raising the stator potential with relation to the line potential and in the flow of stator charge out to the line. The movement of the rotor beyond position B now results in an increase of rotor-stator capacitance, causing the potential of the stator to fall rapidly back to ground potential.

Further movement of the rotor from the point at which the stator reaches ground potential makes the stator positive relative to ground and causes the valve 43 to conduct. The consequent flow of electrons to the stator persists until the position of maximum rotor-stator capacitance is reached. The flow of electrons eventually brings the stator to ground potential. This corresponds to the starting point of the cycle and the process is repeated.

During the interval in the movement of the rotor from position B to the point where the stator reaches ground potential, a small amount of mechanical work is being recovered due to the action of the residual charge in the rotor-stator capacitance. The amount of work thus recovered, however, is less than that done by the source of mechanical power acting through the driving shaft during the interval from position A to position B by the amount of the electrical work performed by the generator in transferring the charge through valve 45. That amount of electrical work is equal to the product of the charge transferred and the load potential E.

In this explanation it is assumed that the voltage drops across the valves during conduction intervals and is negligible in comparison to inducing voltage V.

It is evident that the output current supplied by the machine as described, though unidirectional, tends to flow in pulses which depend on the variation in the rotor-stator capacitance and on the output and inducing potentials. The use of a load capacitance large in comparison to the rotor-stator capacitance would be effective in smoothing out the voltage pulsations resulting from this discontinuous current flow.

A substantially steady flow of current, however, may be produced by providing separate units having each its own rectifying system, the action of such units being in staggered or overlapping time relation so that the current impulses of the several units succeed each other to give the effect on the output circuit of a substantially continuous current flow. In a generator of the type shown in Figs. 1 and 2, this result may be secured by a slight modification in the construction of the rotor and stator. Such a construction is indicated in Figs. 5 and 6, where the generator is separated into four units or sections.

In this form of apparatus, the stator (Fig. 5), instead of having a common metallic shell, is separated into four sections consisting each of an annular ring 75 with inwardly extending sector shaped poles 77, the rings of the several sections, however, being insulated from each other by the insulators 79. In an axial direction the poles 77 of the successive sections are aligned with each other.

The rotor comprises a single unitary conductive structure mounted on the same rotary hub with the poles 81 of the several sections maintained at a continuously high potential from the same potential source. It is of a construction similar to that illustrated in connection with Figs. 1 and 2, save for the fact that the sector shaped poles of each one of the four sections are offset angularly about the axis of rotation from the poles of the next adjoining section, so that the poles of successive sections reach and recede from their positions of maximum rotor-stator capacitance in succession and in equally spaced timed relation. The same result may be accomplished by angularly offsetting the poles of the several stator sections instead of the poles of the rotor sections. If, for example, each rotor and stator member comprises sixteen poles, as in the construction of Fig. 2, where the sector shaped poles are positioned about the axis of rotation at intervals of 22½° (representing one cycle of generator operation), the rotor sections are spaced around the hub so that the poles of one section are 5⅝° in advance of the poles of the next succeeding section. Such relationship is indicated in Fig. 6, where the position of two adjoining stator poles 77 is shown in dotted lines and the positions of the poles of the four different rotor sections are indicated at one particular stage of rotation. It will be observed that when the rotor pole $81^a$ of one section reaches its position of maximum capacitance, the pole $81^b$ of the next section is half way from that position and approaching the position of minimum capacitance, the pole $81^c$ of the next section at the position of minimum capacitance, and the pole $81^d$ of the fourth section half way from the latter position and approaching that of maximum capacitance.

For simplification, Fig. 5 illustrates each section as consisting of a single rotor member in interleaving relation between two stator members, but each section may comprise as many rotor and stator members as desired.

The rectifying system, in case of the illustrative sectionalized arrangement of the generator, is indicated in Fig. 4 where the four separate insulated stator sections 15a, 15b, 15c and 15d are in interleaved relation, respectively, to the rotors 17a, 17b, 17c and 17d, the latter, however, being each electrically connected to the same source of inducing potential 31. Each stator, however, is provided with its own two rectifying valves, the stator 15a being connected to the valves 43a and 45a, the stator 15b to the valves 43b and 45b, and so on, each of the valves 43 being connected to the ground and each of the valves 45 being connected to the load or output circuit 73.

The power which can be delivered by an electrostatic generating apparatus of the type described may be illustrated by the following example.

If it is assumed that the rotor (as in Figs. 1 and 2) has ten members of sixteen poles each with an external rotor diameter of 24 inches and a hub diameter of 6 inches and the separation between the adjoining rotor and stator poles is 6 millimeters, and it is further assumed that the rotor is rotated at a speed of 3600 revolutions per minute, with a substantially constant output voltage E at 100,000 volts and a constant inducing potential V at 100,000 volts impressed on the rotor, then the electrical power output of such a machine would be about 20 kilowatts. It will be seen that, under these assumptions, a machine of these physical characteristics possesses a power compactness comparable with present electro-magnetic machines and makes available in a single unit electrostatically generated direct current power of very high voltage.

To provide for proper surface conditions of the electrodes and insulators and adequate vacuum insulation, the vacuum maintained in the chamber enclosing such an illustrative machine should preferably be of the order of $10^{-5}$ millimeters of mercury or better.

Applicant's investigations on the insulating properties of vacuum and material insulation therefor show that between suitable metallic electrodes held apart in vacuum voltages as high as 10,000 can be insulated with gradients of about 5,000,000 volts per centimeter. When the potential difference is 100,000 volts, gradients somewhat greater than 1,000,000 per centimeter can be insulated. With voltages of the order of 500,000 volts, a gradient which can be insulated is about 100,000 per centimeter. These voltages and gradients which can be insulated are of the same order of magnitude as those utilized in the above illustrative machine, and the application of these principles to the electrostatic generator permits the attainment of high voltage and substantial power with compact insulation.

It may be observed that generators, typified by the illustrative example, not only provide for the practical attainment of high voltage output but are inherently capable of extremely high efficiency. Electrostatic machines of the type herein described have shown an electrical efficiency of about 99% under actual working conditions. Such high efficiency is due not only to the absence of magnetic losses and to the extremely small dielectric and resistance losses which characterize the operation of electrostatic machinery adequately insulated in vacuum or high insulating gaseous media, but is due also to the efficiency of the charge transferring process employed. For example, if a charged condenser be connected across a second and uncharged condenser of equal capacitance, then, regardless of the resistance of the circuit, an amount of energy equal to twice the energy transferred is lost as heat. In a machine of the type herein described, due to the method and means for effecting such transfer, the transfer of charges between the charge receiving element and the terminals of the load circuit are effected at points in the cycle of operation of the machine when the potential differences between such charge receiving element and such terminals are but slightly different and substantially the same, so that the efficiency of the charge transferring process is extremely high. Such high inherent efficiency is absent in various forms of electrostatic machines of the conventional type of the prior art.

The necessary commutation is herein performed electronically and, when vacuum insulation is employed, preferably with the filament and plate housed in the same vacuum as the machine itself. This eliminates the necessity of glass or other envelopes and avoids flashing over and other voltage limitations where such enveloped valves are employed in the atmosphere. It further avoids the necessity of bringing out the high voltage connections through bushings into the atmosphere, and further simplifies the construction in that it very materially reduces the space occupied by such valves when placed in vacuum without the usual insulating envelopes.

Whether used in vacuum or with other insulating media, the electronic commutation automatically adjusts itself to any load condition, the electronic valves becoming conducting or insulating at precisely the desired point in the cycle of operation and in a manner which cannot be obtained readily by mechanical commutating devices. Mechanical commutation alone, however, may be employed or may be employed in conjunction with electronic valves to relieve the valves of the necessity of withstanding all the voltage difference between the line terminals and the stator.

It will be further observed that the method of charge induction and charge transfer here utilized permits the effective use of the charge receiving element in the form of a single unitary multipolar structure of conductive metal throughout, insulated from the walls of the chamber by simple compact stationary insulators. It further permits the use of a rotor, also in the form of a single unitary multipolar structure of conductive metal throughout, insuring the necessary ruggedness for high speed rotation and the required reliability for practical, high voltage, load requirements. The demonstrated advantages of vacuum insulation and the properties of material insulation for the electrodes in vacuum can thus be most effectively applied to the insulation of the relatively movable interleaving electrodes as can the superior qualities of the other insulating media referred to.

The interleaving type of construction is of a form which permits a maximum capacitance variation per unit size machine and is capable of high speed rotation. It is particularly adapted to the multipolar construction, which is important since, under certain practical conditions of operation and for a given speed of rotation, the power produced by the generator is approximately proportional to the number of poles.

For certain useful purposes, such, for example, as the production of high voltage X-rays or other high energy radiations, in which the source of radiation constitutes the load on the generator, the entire load circuit, with the energy translating elements constituting the load, may be contained within the same evacuated chamber as encloses the generator itself.

Such an arrangement is indicated in partially diagrammatic form in Fig. 7, where the generator within the casing 11 and its electrical connections are substantially as shown in Fig. 1. The load, however, is provided by the flow of electrons from a filament heating circuit 85, also surrounded by the insulating medium, and positioned within the metallic cup 87. In line with and opposed to the filament and the radiations therefrom there is positioned at the end of the tubular extension 89 of the casing 11 an X-ray target 91 which may be air or water cooled. The tubular extension is enclosed by a lead sheathing 93 presenting in front of the target a portal 95 to provide for the emission of the high voltage X-rays.

To provide the desired capacitance for the load circuit, there is provided the condenser 97 having one side grounded to the container casing and the other side connected to the cup 61 of the valve 45 and also to the cup 87 of the filament. The filament heating circuit may be arranged for external control, as by a rheostat (not shown) operated through an insulating link.

While the continuously applied inducing voltage V may be supplied by a battery system, electrostatic devices or other means, it is preferably supplied by an electromagnetic device, such as the transformer rectifier instanced, equipped with means for controlling the potential applied to the rotor. Since the ratio of the maximum to the minimum rotor-stator capacitance is fixed by the design of the machine, variation in the potential applied to the rotor provides means for definitely controlling both the potential and power output of the generator.

While, for the purpose of illustrating the principles underlying the herein described method and apparatus, there is herein shown one single embodiment of the invention, it is to be understood that wide deviations from the form, detail and relative arrangement of parts herein shown may be made, all within the principles and spirit of the invention herein described and the claims hereinafter made and all without departing from the scope of the invention.

We claim:

1. An electrostatic generator comprising a stator element having a plurality of poles and consisting of a single metallic conductive structure, and a rotor element also having a plurality of poles and consisting also of a single metallic conductive structure, the poles of the rotor being closely spaced from and in interleaving relation to the poles of the stator and arranged to provide positions of maximum and minimum capacitance, a container providing a highly evacuated chamber in which said generator is positioned, means to insulate said rotor and stator from the walls of said container, means for continuously impressing on one of said elements from a separate source a high potential of constant polarity, a load circuit, and means for transferring the charges unidirectionally from one terminal of the load circuit to the stator and from the stator to the other terminal of the load circuit, the same comprising electronic valves also contained within said evacuated chamber, one of which valves is between the stator and one terminal of the load circuit and the other between the stator and the opposite terminal of the load circuit.

2. An electrostatic generator for generating high direct current potential, comprising a stationary and a rotatable element adapted alternately to assume positions of maximum and minimum capacitance, means for constantly impressing on one of said elements from a separate source a high potential of constant polarity, and means for transferring charges from the lower potential side of the load circuit to the other element and from said other element to the higher potential side of the load circuit.

3. An electrostatic generator comprising relatively movable charge inducing and charge receiving members adapted alternately to assume positions of maximum and minimum capacitance, means for constantly impressing on said inducing member from a separate source a high potential of constant polarity, a container in which said generator is surrounded by a highly insulating medium, a load circuit, and means to convey a charge from the lower potential side of the load circuit to the charge receiving member during one interval of the cycle of operation of the machine and to convey a charge from the charge receiving member to the higher potential side of the load circuit during another interval of the cycle of operation of the machine.

4. An electrostatic generator comprising relatively rotatable charge inducing and charge receiving elements, a load circuit, a container in which said elements are surrounded by a highly insulating medium, and electronic valves also within said chamber for transfering induced charges between the low and high potential sides of the load circuit.

5. An electrostatic generator comprising relatively rotatable charge inducing and charge receiving members adapted alternately to assume relative positions of maximum and minimum capacitance, a load circuit, and means to cause a charge to pass unidirectionally from the lower potential side of the load circuit to the charge receiving member during a period of increasing capacitance and from the charge receiving member to the higher potential side of the load circuit during a period of lessening capacitance, said means comprising an electronic valve between one side of the line and the charge receiving member and a second electronic valve between the charge receiving member and the other side of the line.

6. An electrostatic generator comprising relatively rotatable charge inducing and charge receiving elements adapted alternately to assume relative positions of maximum and minimum capacitance, a load circuit, and a plurality of electronic valves mounted to cause a charge to flow into and out of the charge receiving element unidirectionally with relation to the load circuit.

7. An electrostatic generator comprising relatively rotatable charge inducing and charge receiving members adapted alternately to reach relative positions of maximum and minimum capacitance, a load circuit, and means to cause a charge to pass unidirectionally from the lower potential side of the load circuit to the charge receiving member during one interval in the cycle of operation and from the charge receiving member to the higher potential side of the load circuit during another interval in the cycle of operation, said charge transferring means involving an energy loss small as compared with the energy usefully transferred to the load circuit.

8. An electrostatic generator comprising relatively rotatable charge inducing and charge receiving elements adapted alternately to assume relative positions of maximum and minimum capacitance, a load circuit, and means to allow the charges to flow into and out of the charge receiving element and unidirectionally with relation to the load circuit under the influence of potential differences slight with relation to the load circuit voltage.

9. An electrostatic generator comprising relatively rotatable charge inducing and charge receiving members consisting each of a number of metallic segmented disks and adapted to interleave relative to one another so as alternately to assume positions of maximum and minimum capacitance, means comprising a separate source of potential for continuously impressing on the charge inducing member a high potential of constant polarity, a load circuit, and means to convey a charge from the lower potential side of the load circuit to the charge receiving member during periods of increasing capacitance and from the charge receiving member to the higher potential side of the load circuit during periods of lessening capacitance.

10. The combination of a plurality of electrostatic generating units, comprising each relatively rotatable charge inducing and charge receiving members, the different units being related to reach a position of maximum capacitance at successive intervals, means for continuously impressing on the charge inducing member of each unit a potential of constant polarity, a load circuit, and means for transferring the individual charges from said several units successively to said load circuit, the same comprising for each unit means to convey charges from the load circuit to the charge receiving member during a period of increasing capacitance and to the load circuit from the charge receiving member during a period of lessening capacitance.

11. The combination of a plurality of electrostatic generating units, comprising each relatively movable charge inducing and charge receiving members, the charge receiving members of each unit being insulated from those of the other units, the different units being related to reach a position of maximum capacitance at successive intervals, a load circuit common to said units, and separate means for said different units for transferring the individual charges unidirectionally from said units to said load circuit.

12. The combination with an electrostatic generator employing relatively movable and interleaving segmental metallic disks, of a container having a highly evacuated chamber in which said generator is contained, and means in the same chamber and energized by the power generated for the acceleration of charged particles.

13. The method of electrostatically generating direct current power and applying the same to a load circuit, which consists in varying the capacitance of two relatively movable bodies from a maximum to a minimum, maintaining a high insulating medium about said bodies, continuously impressing on one of said bodies a high potential of constant polarity from a separate source, and conveying by means of an ionic rectifier induced charges between the other body and the load circuit.

14. The method of electrostatically generating direct current power and applying the same to a load circuit, which consists in varying the capacitance of two bodies between a maximum and a minimum, continuously applying from a separate source to one of said bodies a high inducing potential of constant polarity and conveying induced charges unidirectionally between the other body and the load circuit.

15. The method of electrostatically generating direct current power and applying the same to a load circuit, which consists in varying the capacitance between maximum and minimum of two bodies maintained in a high insulating medium, inducing on one of said bodies a charge from the low potential side of the load circuit and raising the potential of said body to approximate the potential of the high potential side of the load circuit, and thereupon transferring said charge to the high potential side of the load circuit under the influence of slight potential difference.

16. The method of electrostatically generating direct current power and transferring the same to the load circuit, which consists in conveying charges unidirectionally between the low and high potential sides of the load circuit by isolating said charges on a stationary metallic member and varying the potential of said member by induction.

17. The method of electrostatically generating direct current power and transferring the same to a load circuit, which consists in utilizing a constantly applied inducing potential of constant polarity, inducing charges in different circuits at successive time intervals, and separately and successively transferring said charges unidirectionally from said different circuits to a common load circuit.

18. An electrostatic direct current generator for power purposes, comprising relatively movable charge inducing and charge receiving members adapted alternately to assume positions of maximum and minimum capacitance, means for continuously impressing on one of said members a high potential constant polarity, a load circuit, and means for causing a uni-directional flow of charge from said charge receiving member to said load circuit.

19. The combination with an electrostatic generator, of a highly evacuated container in which said generator is contained, and means also in said evacuated container for the acceleration of charged particles, said means being energized by the power generated by said generator.

ROBERT J. VAN DE GRAAFF.
JOHN G. TRUMP.